(12) United States Patent
Byeon et al.

(10) Patent No.: US 11,059,330 B2
(45) Date of Patent: Jul. 13, 2021

(54) TIRE HAVING V-SHAPED KERFS

(71) Applicant: Hankook Tire Co., Ltd., Seoul (KR)

(72) Inventors: Jae Surb Byeon, Daejeon (KR); Ha Eun Koog, Seoul (KR)

(73) Assignee: Hankook Tire Co., Ltd., Seoul (KR)

( * ) Notice: Subject to any disclaimer, the term of this patent is extended or adjusted under 35 U.S.C. 154(b) by 269 days.

(21) Appl. No.: 16/195,375

(22) Filed: Nov. 19, 2018

(65) Prior Publication Data

US 2019/0291514 A1 Sep. 26, 2019

(30) Foreign Application Priority Data

Mar. 23, 2018 (KR) .................... 10-2018-0033565

(51) Int. Cl.
 *B60C 11/12* (2006.01)
 *B33Y 80/00* (2015.01)
 *B60C 11/03* (2006.01)

(52) U.S. Cl.
 CPC .......... *B60C 11/1204* (2013.01); *B33Y 80/00* (2014.12); *B60C 11/0302* (2013.01); *B60C 11/1236* (2013.01); *B60C 11/1272* (2013.01); *B60C 11/1281* (2013.01); *B60C 2011/1213* (2013.01)

(58) Field of Classification Search
 CPC ....... B60C 11/1204; B60C 11/11; B60C 11/12
 See application file for complete search history.

(56) References Cited

U.S. PATENT DOCUMENTS

| 6,315,018 | B1 | 11/2001 | Watanabe | |
|---|---|---|---|---|
| 2003/0019555 | A1* | 1/2003 | Nakagawa | .......... B60C 11/0302 |
| | | | | 152/209.18 |
| 2012/0234443 | A1* | 9/2012 | Kurokawa | .......... B60C 11/1281 |
| | | | | 152/209.18 |
| 2013/0000805 | A1* | 1/2013 | Oodaira | ................. B60C 11/11 |
| | | | | 152/209.18 |

FOREIGN PATENT DOCUMENTS

| CA | 1324070 C | 11/1993 |
|---|---|---|
| JP | 2545099 B2 | 10/1996 |
| JP | H11-151913 A | 6/1999 |
| KR | 101037410 B1 | 5/2011 |

* cited by examiner

*Primary Examiner* — Robert C Dye
*Assistant Examiner* — Farah Taufiq
(74) *Attorney, Agent, or Firm* — Novick, Kim & Lee, PLLC; Jae Youn Kim; Jihun Kim

(57) ABSTRACT

A tire having includes a V-shaped kerf to increase the directionality of running of the tire and having a drainage section at the lower side of the kerf to enhance (e.g., improve) the water drainage performance. The tire having V-shaped kerfs includes a kerf formed on a block and allowing water introduced thereinto to be discharged to a groove, and a drainage section connected to the groove to discharge the water to the groove, the drainage section being a space defined in the longitudinal direction of the kerf.

8 Claims, 2 Drawing Sheets

TIRE HAVING V-SHAPED KERFS

BACKGROUND OF THE INVENTION

Field of the Invention

The present invention relates to a tire having V-shaped kerfs, and more particularly, to a tire having a V-shaped kerf to increase directionality of running of the tire and having a drainage section at the lower side of the kerf to improve water drainage performance.

Description of the Related Art

Currently, heavy-duty tires have been developed into markets requiring fuel efficiency, mileage, and friction performance. Accordingly, since the friction performance is required as the main performance of the tire and not as additional performance, techniques for kerfs are steadily developing to improve frictional force.

The related art uses a method of applying a moisture inlet to a tread and absorbing moisture on the surface of the tread into the tread to improve the running performance of the tire on wet road surface, or a method of applying a general kerf to the upper portion of the tire and enlarging the bottom of the kerf to remove moisture to a groove.

Korean Patent No. 10-1037410 (entitled "Tread Kerf of Heavy-duty Tire") discloses a tire in which in a tread kerf of a heavy-duty tire configured such that its lower end has a larger capacity than the inlet of the kerf to enhance the braking and durability of the tire on the surface of water and ice by using the kerf on a block, the lower end of the kerf connected to the inlet of the kerf through a corrugated connection hole is formed of a venturi meter-type flow tube, thereby rapidly increasing a flow of air and a drainage speed.

CITATION LIST

Patent Literature

Patent Literature 1: Korean Patent No. 10-1037410

SUMMARY OF THE INVENTION

The present invention has been made in view of the above-mentioned problem, and an object thereof is to provide a tire with a kerf to increase directionality of running of the tire and improve a function of absorbing and discharging water on the road surface during rolling motion of the tire.

The present invention is not limited to the above-mentioned object, and other objects of the present invention can be clearly understood by those skilled in the art to which the present invention pertains from the following description.

To accomplish the object described above, a tire in which a block and a groove are formed on a tread according to an aspect of the present invention includes a kerf formed on the block and allowing water introduced thereinto to be discharged to the groove, and a drainage section connected to the groove to discharge the water to the groove, the drainage section being a space defined in a longitudinal direction of the kerf, wherein the kerf has a V-shape bent about a center axis of the kerf that is perpendicular to a circumferential direction of the tire and passes through the center of the kerf.

In the aspect of the present invention, the kerf may be bent at a bending angle from 120 degrees or more to less than 180 degrees for the V-shape.

In the aspect of the present invention, the drainage section may have a shape in which its cross-sectional area gradually increases from the center of the kerf toward the groove.

In the aspect of the present invention, the cross-sectional area of the drainage section through which the center axis of the kerf passes may range from ¼ to ⅔ of the cross-sectional area of a drain provided in the drainage section for discharge of the water therefrom.

In the aspect of the present invention, the drainage section may be formed between a lower end of the kerf and a half point of the depth of the kerf.

In the aspect of the present invention, a kerf upper portion, which is a portion of the kerf located above the drainage section, may have a width of 0.3 mm or more.

In the aspect of the present invention, the drainage section may have a width ranging from ⅕ to ½ of the width of the groove.

In the aspect of the present invention, the width of the drainage section may be 0.6 mm or more.

In the aspect of the present invention, the tread may be formed by 3D printing.

DETAILED DESCRIPTION OF THE PREFERRED EMBODIMENTS

Figure 1:
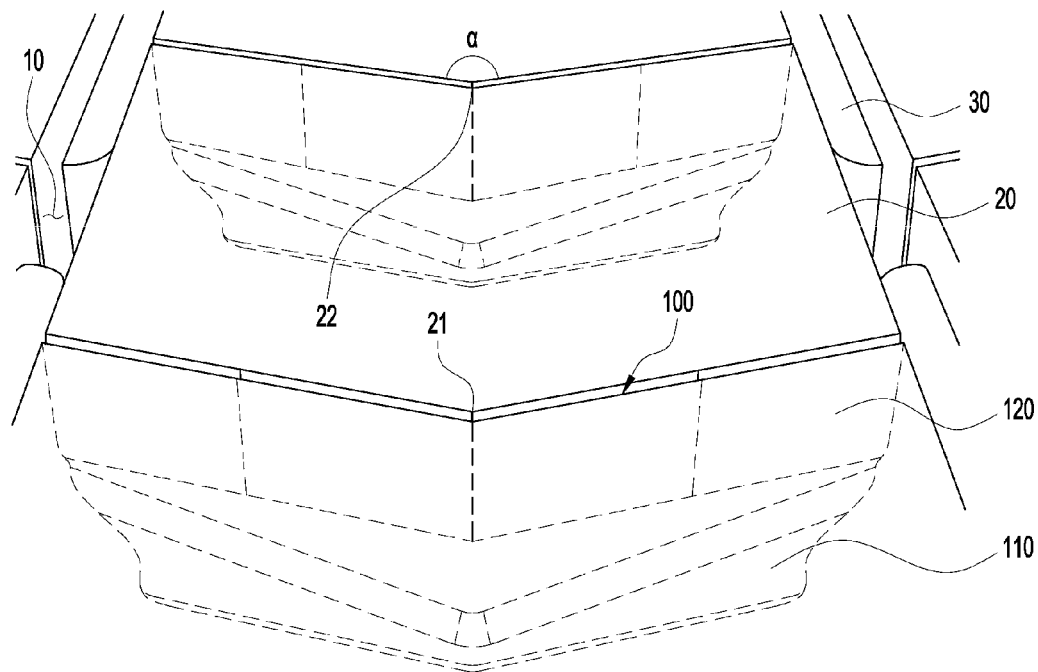
FIG. 1 is a schematic view illustrating a tread according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
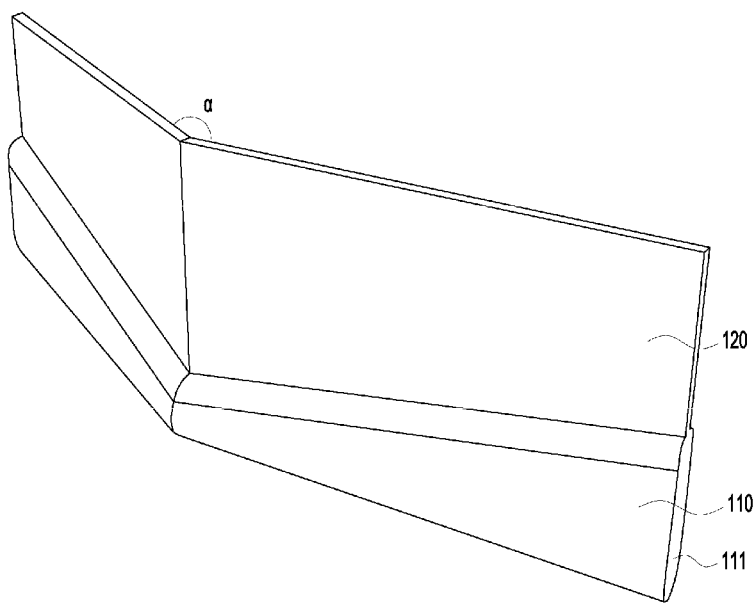
FIG. 2 is a three-dimensional perspective view illustrating a space of a kerf according to the embodiment of the present invention.
Figure 3:
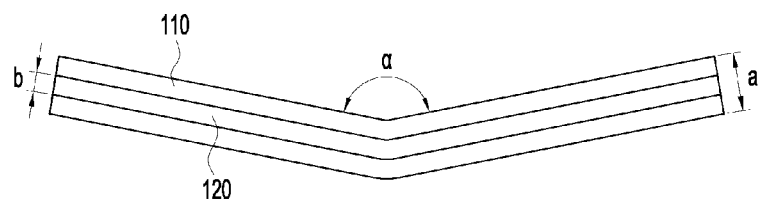
FIG. 3 is a top view illustrating the space of the kerf according to the embodiment of the present invention.
Figure 4:
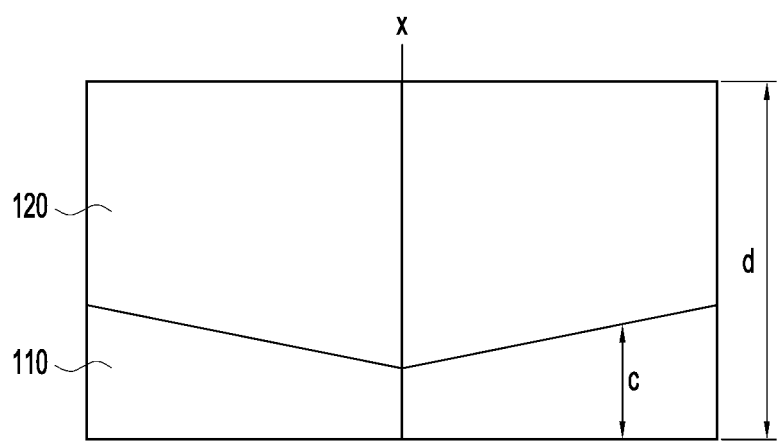
FIG. 4 is a front view illustrating the space of the kerf according to the embodiment of the present invention.

FIG. 1 is a schematic view illustrating a tread according to an embodiment of the present invention. FIG. 2 is a three-dimensional perspective view illustrating a space of a kerf 100 according to the embodiment of the present invention. FIG. 3 is a top view illustrating the space of the kerf 100 according to the embodiment of the present invention. FIG. 4 is a front view illustrating the space of the kerf 100 according to the embodiment of the present invention.

FIG. 2 may be a three-dimensional view illustrating the space of the kerf 100 to make it easier to visually identify the space. FIGS. 3 and 4 may be top and front views of FIG. 2 to make it easier to visually identify the space.

That is, the reference numerals in FIGS. 2 to 4 may be marks of respective spaces defined in the kerf 100.

As illustrated in FIGS. 1 to 4, the tire of the present invention is a tire in which a block 20 and a groove 10 are formed on a tread, and may include a kerf 100 which is formed on the block and allows the water introduced thereinto to be discharged to the groove 10, and a drainage section 110 which is a space defined in the longitudinal direction of the kerf 100 and is connected to the groove 10 to discharge water to the groove 10.

The kerf 100 may have a V-shape bent about a center axis x of the kerf that is perpendicular to the circumferential direction of the tire and passes through the center of the kerf 100.

As described above, the directionality of running of the tire can be increased since the kerf 100 has the V-shape, and the water drainage performance can be improved since the drainage section 110 is provided at the lower side of the kerf 100. When the kerf 100 has the V-shape, the block 20 may have a convex portion 21 that is convex in the running direction of the tire and a concave portion 22 that has a shape corresponding to the convex portion 21. The convex portion 21 and the concave portion 22 come into contact with each other when a force in a direction different from the running direction of the tire is applied thereto to prevent the block 20 from being twisted, so that the directionality of running of the tire can be increased.

The tread may be formed by 3D printing.

The tire of the present invention may be manufactured using a 3D printer in order for the kerf 100 formed on the tread to have the above shape.

Although the tire is described as being manufactured by 3D printing in the embodiment of the present invention, the present invention is not necessarily limited thereto. For example, the tire of the present invention may be manufactured by conventional methods.

As illustrated in FIGS. 1 and 2, the kerf 100 may be bent at a bending angle α from 120 degrees or more to less than 180 degrees for the V-shape.

The kerf 100 may have a V-shape by bending the kerf 100 at a bending angle α.

If the bending angle α is less than 120 degrees, the fluidity of the water discharged from the drainage section 110 to the groove 10 may be deteriorated, which may cause the uneven wear of the block 20.

If the bending angle α is 180 degrees, the kerf 100 may not have the V-shape. Hence, it is impossible to increase the directionality of running of the tire.

Since the kerf 100 has the V-shape as described above, the drainage section 110 may also have a bent shape to be formed in a V-shape.

The drainage section 110 may have a shape in which its cross-sectional area gradually increases from the center of the kerf 100 toward the groove 10.

Thus, in the process where the tire is worn out, the exposure of the drainage section 110 begins from a portion of the drainage section 110 near the groove 10, specifically from both sides of the drainage section 110 in the direction of a drain 111, and the drainage section 110 is gradually exposed from the middle of wear. Therefore, it is possible to maintain the friction performance of the tire even when the tire is worn out.

However, controlling a portion of the drainage section 110 to be exposed from a predetermined point of time during the process of wear may be determined by the height at both sides of the drainage section 110.

Here, the height c of the drainage section may be a length from the bottom surface of the drainage section 110 to the connection portion between the drainage section 110 and a kerf upper portion 120. The variable cross-sectional area of the drainage section 110 may be proportional to the variable height c of the drainage section 110.

Specifically, the cross-sectional area of the drainage section 110 may be changed by making the width a of the drainage section constant and changing the height c of the drainage section. The cross-sectional area of the drainage section 110 may be increased from the center of the kerf 100 toward the groove 10 by making the width a of the drainage section constant and increasing the height c of the drainage section from the center of the kerf 100 toward the groove 10.

Although the cross-sectional area of the drainage section 110 is described as being changed by fixing the width a of the drainage section and changing the height c of the drainage section in the embodiment of the present invention, the present invention is not necessarily limited thereto. For example, it is possible to change the cross-sectional area of the drainage section 110 by simultaneously changing the width a and height c of the drainage section.

When the cross-sectional area of the drainage section 110 increases from the center of the kerf 100 toward the groove 10, it is possible to enlarge the area of the drain 111 while maintaining the durability of the block 20 and to easily discharge water from the drainage section 110 to the groove 10.

The cross-sectional area of the drainage section 110 through which the center axis x of the kerf passes may range from ¼ to ⅔ of the cross-sectional area of the drain 111 provided in the drainage section 110 for discharge of water therefrom.

Here, the cross-sectional area of the drainage section 110 through which the center axis x of the kerf passes may be a drainage section's central cross-sectional area. If the drainage section's central cross-sectional area is less than ¼ of the cross-sectional area of the drain 111, the durability of the block 20 is relatively increased but the flow of water to the center of the drainage section 110 is limited, which may deteriorate the water discharge performance.

If the drainage section's central cross-sectional area exceeds ⅔ of the cross-sectional area of the drain 111, the durability of the block 20 may be deteriorated.

As illustrated in FIGS. 2 and 4, the drainage section 110 may be formed between the lower end of the kerf 100 and a half point of the depth d of the kerf.

If the drainage section 110 is formed between the inlet of the kerf 100 and the half point of the depth d of the kerf, the durability of the block 20 may be deteriorated due to an increase in space volume of the drainage section 110.

The kerf upper portion, which is a portion of the kerf 100 located above the drainage section 110, may have a width b of 0.3 mm or more.

In the case where the tire of the present invention is manufactured by 3D printing, if the width b of the kerf upper portion is less than 0.3 mm, the 3D printing is not easily performed and there is a risk of breakage in manufacturing the tire.

The width a of the drainage section may range from ⅕ to ½ of the width of the groove 10.

If the width a of the drainage section is less than ⅕ of the width of the groove, the durability of the block 20 is relatively increased but the flow of water to the center of the drainage section 110 is limited, which may deteriorate the water discharge performance.

If the width a of the drainage section exceeds ½ of the width of the groove, the durability of the block 20 may be deteriorated.

The width a of the drainage section may be 0.6 mm or more.

If the width a of the drainage section is less than 0.6 mm, the amount of water discharged to the drain 111 may be significantly reduced.

The drainage section 110 may have various shapes, preferably be a rectangular parallelepiped. When the drainage section 110 has a rectangular parallelepiped cross-sectional area, each edge thereof may be rounded.

When the drainage section 110 has the rectangular parallelepiped cross-sectional area, the width a of the drainage section may be a length between both sides perpendicular to the bottom surface of the drainage section 110.

However, when the drainage section 110 has another shape such as an ellipse, the width a of the drainage section may mean the longest length among the lengths in the direction perpendicular to the depth d of the kerf in the drainage section 110.

The depth d of the kerf may range from 50 to 100% of the depth of the groove 10. The friction performance of the tire of the present invention can be controlled by regulating the depth d of the kerf. Specifically, the friction performance of the tire of the present invention can be enhanced as the depth d of the kerf is increased. However, the performance of the tire is not increased unconditionally even when the friction performance of the tire is increased, and the friction performance of the tire can be controlled according to the use of the tire or the like.

As illustrated in FIG. 1, the tire of the present invention may include an auxiliary block 30. Since the auxiliary block 30 is provided on the side of the block 20, the durability of the block 20 can be enhanced even though the drainage section 110 is formed.

The auxiliary block 30 may be formed adjacent to the drain 111. The auxiliary block 30 may have a perforated portion formed by perforating a portion adjacent to the drain 111. The perforated portion may be connected to the drain 111, so that the drain 111 is connected to the groove 10 even though the auxiliary block 30 is formed on the side of the block 20, thereby enabling water to easily flow from the drainage section 110 to the groove 10.

The present invention with the above-mentioned configuration has an effect of increasing the directionality of running of the tire by having the V-shaped kerf and of improving the water drainage performance by having the drainage section at the lower side of the kerf.

In addition, the present invention has an effect of maintaining friction performance by gradually exposing the drainage section from the middle of wear.

The present invention is not limited to the above effects, and it should be understood that the present invention includes all effects which can be inferred from the detailed description of the present invention or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A tire comprising:
    a block and a groove formed on a tread;
    a kerf formed on the block being configured to allow water introduced thereinto to be discharged to the groove; and
    a drainage section connected to the groove to discharge the water to the groove, the drainage section being a space defined in a longitudinal direction of the kerf,
    wherein the kerf has a V-shape bent about a center axis of the kerf that is perpendicular to a circumferential direction of the tire and passes through the center of the kerf, and
    wherein the drainage section has the same V-shape bent as the kerf and has a shape in which its cross-sectional area gradually increases from the center of the kerf toward the groove by keeping a width of the drainage section constant and linearly increasing a height of the drainage section from the center of the kerf toward the groove.

2. The tire according to claim 1, wherein the kerf is bent at a bending angle from 120 degrees or more to less than 180 degrees for the V-shape.

3. The tire according to claim 1, wherein the cross-sectional area of the drainage section through which the center axis of the kerf passes rang from ¼ to ⅔ of a cross-sectional area of a drain for discharge of the water therefrom.

4. The tire according to claim 1, wherein the drainage section is formed between a lower end of the kerf and a half point of a depth of the kerf.

5. The tire according to claim 1, wherein the kerf includes an upper portion located above the drainage section, and having a width of 0.3 mm or more.

6. The tire according to claim 1, wherein the drainage section has a width ranging from ⅕ to ½ of a width of the groove.

7. The tire according to claim 6, wherein the width of the drainage section is 0.6 mm or more.

8. The tire according to claim 1, wherein the tread comprises: 3D printed layers.

* * * * *